(12) United States Patent
Tanimura et al.

(10) Patent No.: US 12,533,757 B2
(45) Date of Patent: Jan. 27, 2026

(54) SEPARATION TOOL FOR LIQUID GASKET ADHESIVE UNIT AND METHOD OF SEPARATING LIQUID GASKET ADHESIVE UNIT USING THE SAME

(71) Applicant: SUBARU CORPORATION, Tokyo (JP)

(72) Inventors: Shinya Tanimura, Tokyo (JP); Masahiro Kida, Tokyo (JP); Saki Shiratori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 354 days.

(21) Appl. No.: 18/449,367

(22) Filed: Aug. 14, 2023

(65) Prior Publication Data

US 2024/0066645 A1 Feb. 29, 2024

(30) Foreign Application Priority Data

Aug. 29, 2022 (JP) .................................. 2022-135865

(51) Int. Cl.
 *B23P 19/04* (2006.01)

(52) U.S. Cl.
 CPC ..................................... *B23P 19/04* (2013.01)

(58) Field of Classification Search
 CPC ..................................................... B23P 19/04
 USPC ............. 29/426.5, 402.02, 402.03, 239, 253; 83/175, 176
 See application file for complete search history.

(56) References Cited

U.S. PATENT DOCUMENTS

| | | | | |
|---|---|---|---|---|
| 5,129,136 A | * | 7/1992 | Richardson | B25B 27/16 29/256 |
| 5,897,743 A | * | 4/1999 | Fujimoto | B26D 3/282 156/701 |
| 6,085,399 A | * | 7/2000 | Fileccia | B25B 27/16 29/257 |
| 6,716,297 B2 | * | 4/2004 | Essig | B29C 65/76 156/712 |
| 2003/0101561 A1 | * | 6/2003 | Kefalas | F16J 15/3268 29/402.02 |
| 2012/0097696 A1 | * | 4/2012 | Gabel | B26D 1/06 83/176 |

(Continued)

FOREIGN PATENT DOCUMENTS

| JP | S64-016380 A | 1/1989 |
|---|---|---|
| JP | 2011-121035 A | 6/2011 |
| JP | 2013-126297 A | 6/2013 |

*Primary Examiner* — Christopher M Koehler
(74) *Attorney, Agent, or Firm* — Smith, Gambrell & Russell, LLP

(57) ABSTRACT

A separation tool for a liquid gasket adhesive unit is configured to separate two members from each other by detaching the two members. The two members include respective end surfaces adhered to each other with the liquid gasket adhesive unit interposed therebetween. The separation tool includes a wedge member and a rotary sawing cutter. The wedge member is configured to be pressed by a pressing part into a gap between the end surfaces of the two members between which the liquid gasket adhesive unit is interposed. The rotary sawing cutter is held inside the wedge member, and is configured to be moved separately from the wedge member in a direction toward the liquid gasket adhesive unit in the gap between the end surfaces of the two members pressed apart by the wedge member.

5 Claims, 5 Drawing Sheets

(56) References Cited

U.S. PATENT DOCUMENTS

2015/0214098 A1* 7/2015 Landru ............ H01L 21/76251
29/426.5

* cited by examiner

SEPARATION TOOL FOR LIQUID GASKET ADHESIVE UNIT AND METHOD OF SEPARATING LIQUID GASKET ADHESIVE UNIT USING THE SAME

CROSS-REFERENCE TO RELATED APPLICATIONS

The present application claims priority from Japanese Patent Application No. 2022-135865 filed on Aug. 29, 2022, the entire contents of which are hereby incorporated by reference.

BACKGROUND

The disclosure relates to a separation tool that separates two members from each other by detaching a liquid gasket adhesive unit interposed between mating faces of the two members, and to a method of separating the liquid gasket adhesive unit using the separation tool.

For example, mating faces of a cylinder block and a cylinder head of a vehicle engine are coated with a liquid gasket, i.e., foamed-in-place gasket (FIPG), which is a sealing material. The liquid gasket is cured to enhance sealing properties of the mating faces of the cylinder block and the cylinder head.

A description is given of the above-mentioned example. Upon replacing components in maintenance of the vehicle engine, for example, an assembly of the cylinder block and the cylinder head is to be separated. However, the mating faces of the cylinder block and the cylinder head are adhered to each other by the liquid gasket, thus making it less easy to perform the operation of separating the cylinder block and the cylinder head from each other.

Examples of a currently available method of separating two components of which mating faces are adhered by the liquid gasket from each other may include a method of separating the two components by inserting a tool such as a flat-blade screwdriver or a crowbar between the mating faces of the two components and prying the mating faces from each other using the tool.

However, separating the two components using the above-described method may result in the mating faces (i.e., seal faces) of the two components being easily damaged by the tool. This damage may cause a decrease in sealing properties of the mating faces (i.e., seal faces) of the two components.

For example, Japanese Unexamined Patent Application Publication (JP-A) No. S64-016380 proposes a mating face separator. In the mating face separator, a fastening bolt through-hole of an apparatus casing having a mating face is worked by adding an inner thread thereto, and a press bolt is screwed into the inner thread for jack-up.

Japanese Unexamined Patent Application Publication (JP-A) No. 2013-126297 proposes a power converter having a case configured by combining a first case body including a first flange part and a second case body including a second flange part. In the power converter, a female screw is bored in the second flange part, and a recess having a bolt abutting surface is provided in the first flange part. Screwing a separation bolt into the female screw of the second flange part allows an end surface of the separation bolt to abut against the bolt abutting surface formed on the recess of the first flange part for jack-up. This allows the first case body and the second case body to be separated from each other.

Japanese Unexamined Patent Application Publication (JP-A) No. 2011-121035 proposes a method of applying a remover that softens a coated film of liquid gasket packing attached to and remaining, in a solidified state, on a joint surface of an apparatus, upon separating assembly joints of apparatuses; infiltrating the remover into a coated film to soften and plasticize the coated film; and removing the coated film from the joint surface.

SUMMARY

An aspect of the disclosure provides a separation tool for a liquid gasket adhesive unit. The separation tool is configured to separate two members from each other by detaching the two members. The two members include respective end surfaces adhered to each other with the liquid gasket adhesive unit interposed therebetween. The separation tool includes a wedge member and a rotary sawing cutter. The wedge member is configured to be pressed by a pressing part into a gap between the end surfaces of the two members between which the liquid gasket adhesive unit is interposed. The rotary sawing cutter is held inside the wedge member, and is configured to be moved separately from the wedge member in a direction toward the liquid gasket adhesive unit in the gap between the end surfaces of the two members pressed apart by the wedge member.

An aspect of the disclosure provides a method of separating a liquid gasket adhesive unit. The method involves separating a liquid gasket adhesive unit from two members including respective end surfaces adhered to each other with the liquid gasket adhesive unit interposed therebetween using the separation tool. The method includes: mounting the support brackets of the separation tool on respective outsides of the two members; pressing the wedge member into a gap between the end surfaces of the two members, between which the liquid gasket adhesive unit is interposed, by a proceeding action of the first screw shank member of the pressing part to press the two members apart; and cutting the liquid gasket adhesive unit by depressing and rotating the rotary sawing cutter by a proceeding action of the second screw shank member while maintaining a state of the two members being pressed apart by the pressing of the wedge member.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
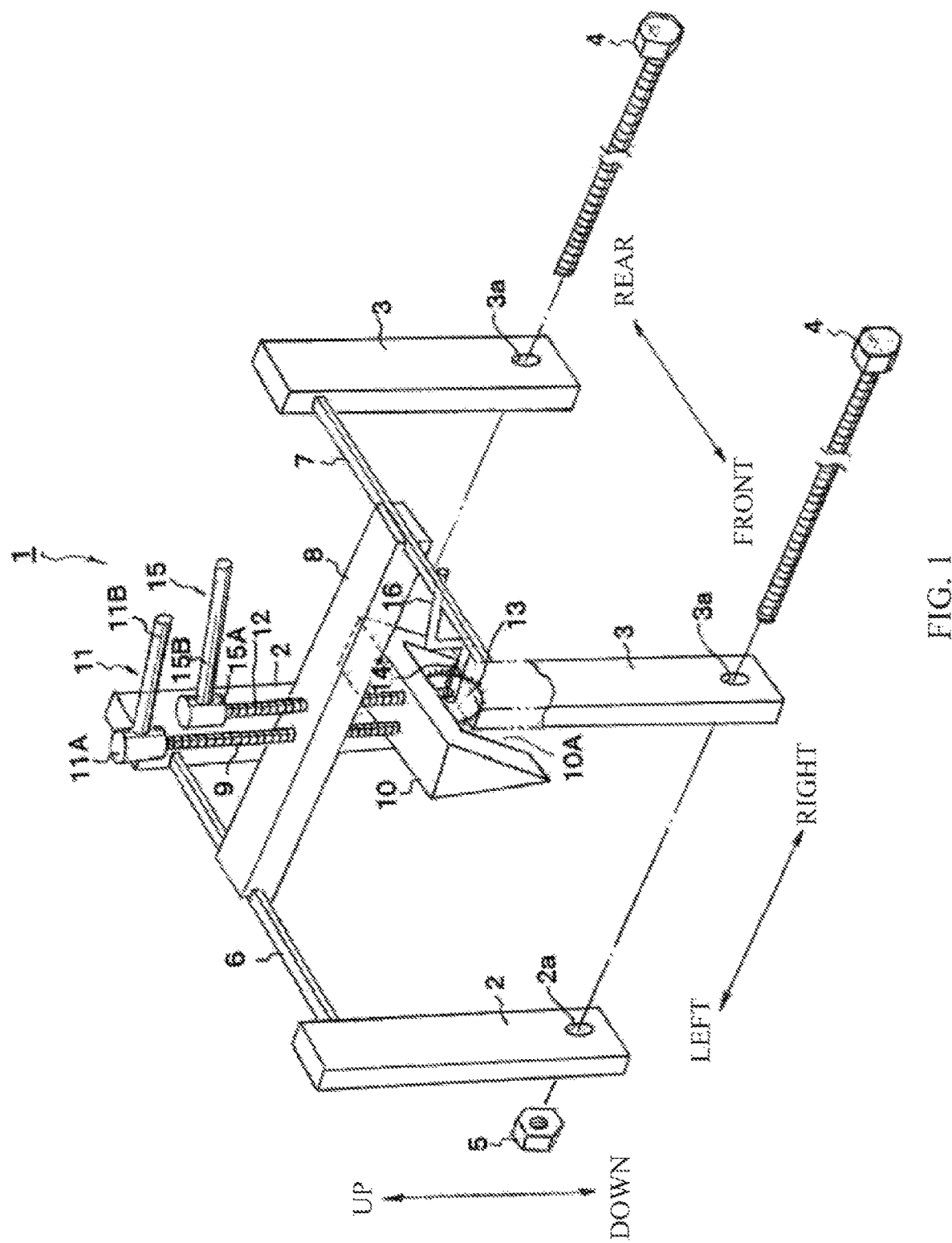
FIG. 1 is a perspective view of a separation tool according to one example embodiment of the disclosure.

When separating an apparatus casing using a mating face separator proposed in JP-A No. S64-016380, a fastening bolt through-hole of the apparatus casing is to be processed by adding an inner thread thereto. This increases the number of processing steps and processing costs. In addition, a dedicated press bolt to be screwed into an inner thread becomes necessary, thus complicating the operation.

When separating a first case body and a second case body from each other in a power converter proposed in JP-A No. 2013-126297, it is necessary to bore a female screw in a second flange part and to form a recess in a first flange part. This increases the number of processing steps and processing costs. In addition, a dedicated separation bolt to be screwed into the female screw becomes necessary, thus complicating the operation, as in JP-A No. S64-016380.

The method described in JP-A No. 2011-121035 involves applying a softening remover to a liquid gasket. It takes a long period of time for the remover to be infiltrated into a coated film to soften and plasticize the coated film, thus resulting in insufficient operating efficiency in separation.

It is desirable to provide a separation tool for a liquid gasket adhesive unit and a method of separating the liquid gasket adhesive unit using the separation tool. The separation tool makes it possible to separate two members from each other easily and surely by cutting the liquid gasket adhesive unit interposed between mating faces of the two members in a short period of time with better operability, without processing for separation.

In the following, some example embodiments of the disclosure are described with reference to the accompanying drawings.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[Configuration of Separation Tool]

Figure 2:
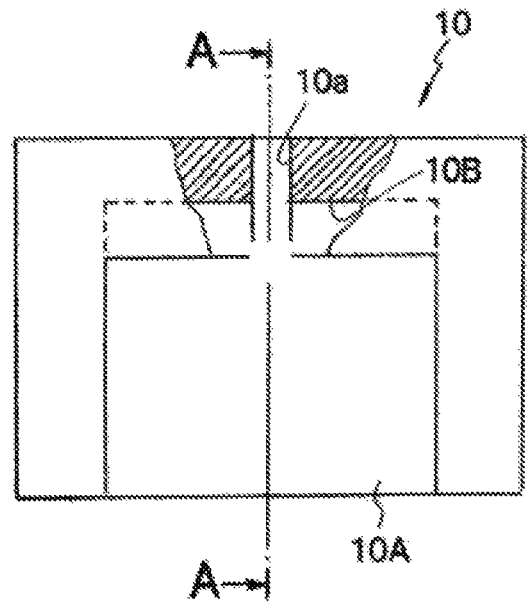
FIG. 2 is a front view of a wedge member of the separation tool according to one example embodiment of the disclosure.
Figure 3:
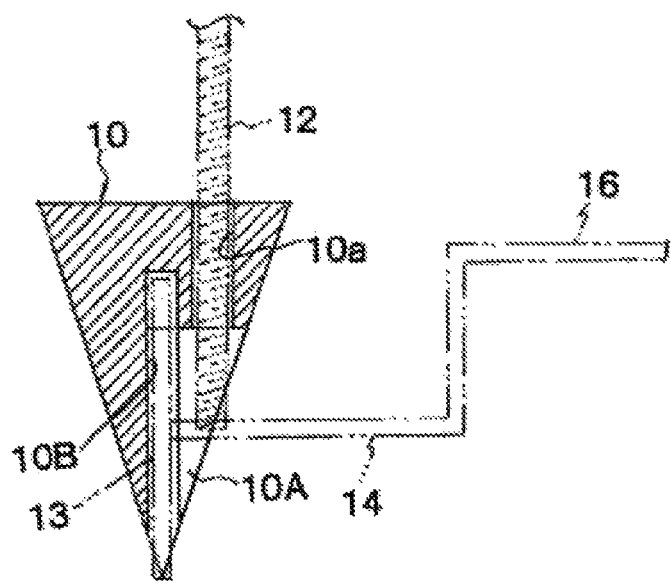
FIG. 3 is a cross-sectional view taken along a line A-A in FIG. 2.

First, a configuration of a separation tool 1 according to an example embodiment of the disclosure is described below with reference to FIGS. 1 to 3.

FIG. 1 is a perspective view of the separation tool 1 according to the example embodiment of the disclosure. FIG. 2 is a front view of a wedge member of the separation tool. FIG. 3 is a cross-sectional view taken along a line A-A in FIG. 2. The separation tool 1 according to the example embodiment of the disclosure may be a tool for cutting a portion of a liquid gasket adhesive unit, which is interposed between mating faces of two members fastened to each other, to separate the two members from each other. The separation tool 1 may be configured as follows. Note that, in the following description, arrow directions illustrated in FIG. 1 are defined as "front-rear", "right-left", and "up-down" directions, respectively.

As illustrated in FIG. 1, the separation tool 1 according to the example embodiment of the disclosure may include a pair of rectangular plate-shaped front and rear support brackets 2 and a pair of rectangular plate-shaped front and rear support brackets 3. The pair of front and rear support brackets 2 may be disposed vertically on a left side, and the pair of front and rear support brackets 3 may be disposed vertically on a right side. Circular holes 2a may be bored in the right-left direction in respective lower parts of the pair of front and rear support brackets 2 disposed on the left side. Circular holes 3a may be bored in the right-left direction in respective lower parts of the pair of front and rear support brackets 3 disposed on the right side. Each of a pair of front and rear bolts 4 may be inserted into the circular holes 2a and 3a. Note that, as described later, a nut 5 may be screwed to be fixed to an end of each of the bolts 4.

A guide rail 6 having a rectangular lateral cross-sectional shape along the front-rear direction may be horizontally stretched between respective upper ends of the pair of front and rear support brackets 2 disposed on the left side. Likewise, a guide rail 7 having a rectangular lateral cross-sectional shape along the front-rear direction may be horizontally stretched between respective upper ends of the pair of front and rear support brackets 3 disposed on the right side. The guide rail 6 and the guide rail 7 may be horizontally disposed parallel to each other along the front-rear direction. Left and right ends of a rectangular block-shaped slider 8 which is long in the right-left direction may fit, respectively, into the guide rails 6 and 7. The slider 8 may be slidable in the front-rear direction along the left guide rail 6 and the right guide rail 7.

A screw shank member 9 may be vertically screwed and inserted into the slider 8 at a middle part thereof in a longitudinal direction (i.e., right-left direction). A lower end of the screw shank member 9 may abut against a top surface of a wedge member 10. The screw shank member 9 may constitute a pressing element that presses the wedge member 10 downward. A handle 11 may be attached to an upper end of the screw shank member 9. The handle 11 may manually rotate the screw shank member 9 about an axial center of the screw shank member 9. The handle 11 may include a fixed member 11A and a round rod-shaped handle bar 11B. The fixed member 11A may be bonded to the upper end of the screw shank member 9. One end of the round rod-shaped handle bar 11B in the longitudinal direction may be inserted into the fixed member 11A, and the round rod-shaped handle bar 11B may extend horizontally from the fixed member 11A.

A screw shank member 12 may be vertically screwed and inserted into a part, of the slider 8, at a part close to the part into which the screw shank member 9 may be screwed and inserted (part near the right of the screw shank member 9). The screw shank member 12 may penetrate a circular hole 10a (refer to FIGS. 2 and 3) bored in the up-down direction in the wedge member 10 to extend vertically downward through the wedge member 10. A lower end of the screw shank member 12 may abut against a rotary shaft 14 bonded to a center of a circular sawing cutter 13 indicated by a chain line in FIG. 3.

The screw shank member 12 may constitute a pressing element that presses the sawing cutter 13 downward via the rotary shaft 14. A handle 15 may be attached to an upper end of the screw shank member 12. The handle 15 may manually rotate the screw shank member 12 about an axial center of the screw shank member 12. The handle 15 may include a fixed member 15A and a round rod-shaped handle bar 15B. The fixed member 15A may be bonded to the upper end of the screw shank member 12. One end of the round rod-shaped handle bar 15B in the longitudinal direction may be inserted into the fixed member 15A, and the round rod-shaped handle bar 15B may extend horizontally from the fixed member 15A. Note that a circular hole 15a (refer to FIG. 5) may be bored in a horizontal direction in the fixed member 15A and the handle bar 15B may be freely inserted into and taken out of the circular hole 15a. That is, the handle bar 15B may be freely attachable to and detachable from the fixed member 15A.

Next, a configuration of the wedge member 10 is described with reference to FIGS. 2 and 3. As illustrated in FIG. 3, the wedge member 10 may be a triangular prism-shaped member having an inverted triangular lateral cross-sectional shape that narrows downward in width. A rectangular opening 10A may be formed on a side surface on one side (i.e., right side) of the triangular prism-shaped member. As indicated by the chain line in FIG. 3, the circular sawing cutter 13 may be held inside the wedge member 10. The wedge member 10 may include a slit-groove-shaped cutter holder 10B that may position and hold the sawing cutter 13. As indicated by the chain line in FIG. 3, the rotary shaft 14 bonded to a center of the sawing cutter 13 may penetrate the opening 10A of the wedge member 10 to extend horizontally. A handle 16 bending in a crank shape may be attached to an end of the rotary shaft 14.

[Method of Separating Liquid Gasket Adhesive Unit]

Thereafter, a method of separating a liquid gasket adhesive unit 20 using the separation tool 1 configured as described above is described with reference to FIGS. 4 to 6.

Figure 4:
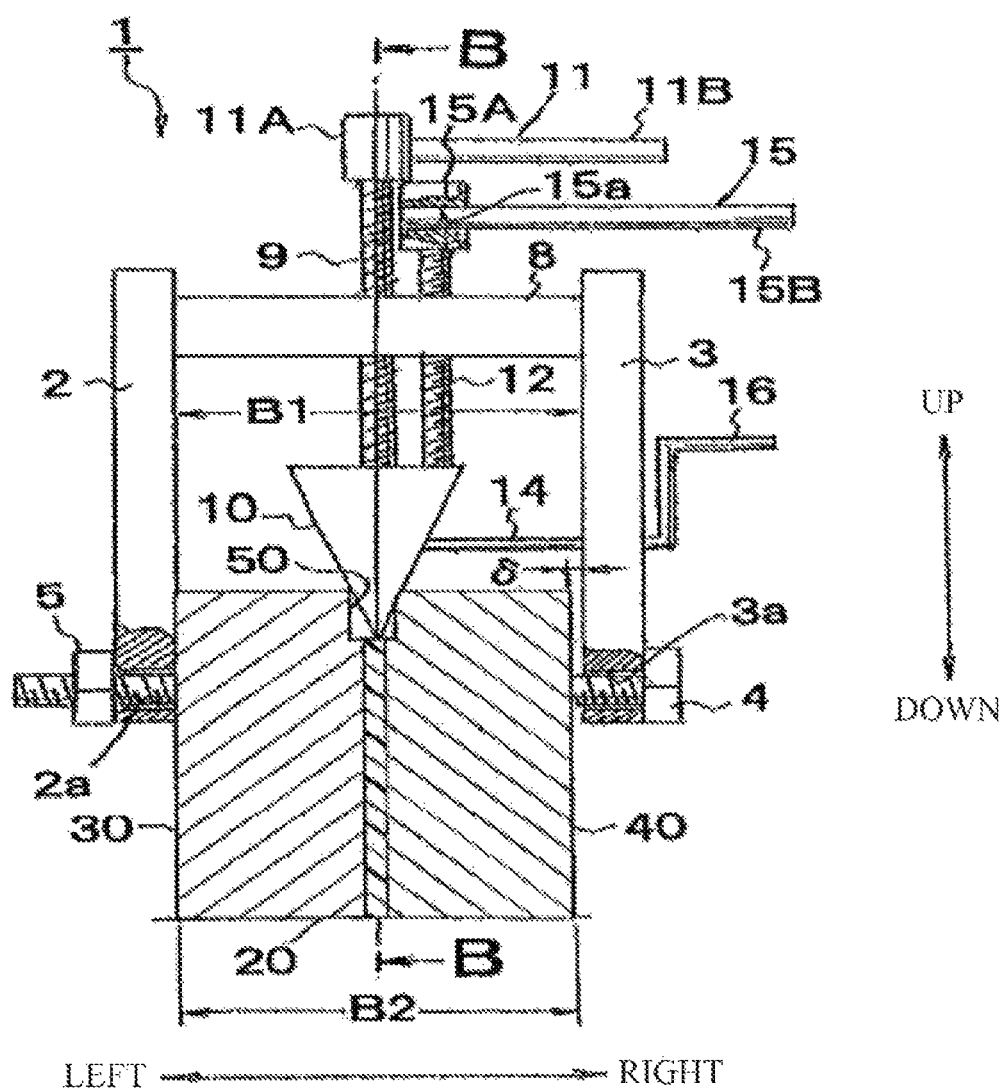
FIG. 4 is a partial front cross-sectional view of a method of separating a liquid gasket adhesive unit according to one example embodiment of the disclosure (a state in which the separation tool is mounted).
Figure 5:
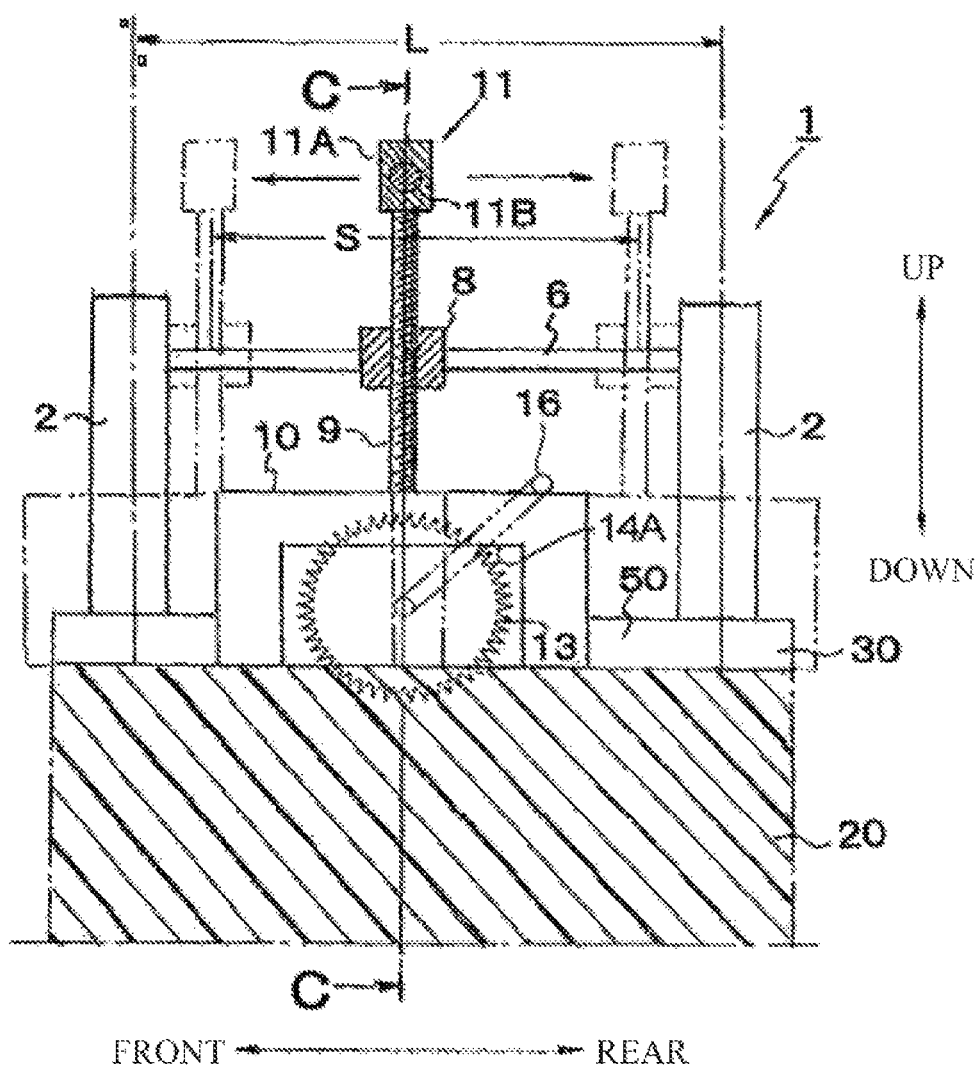
FIG. 5 is a cross-sectional view taken along a line B-B in FIG. 4.
Figure 6:
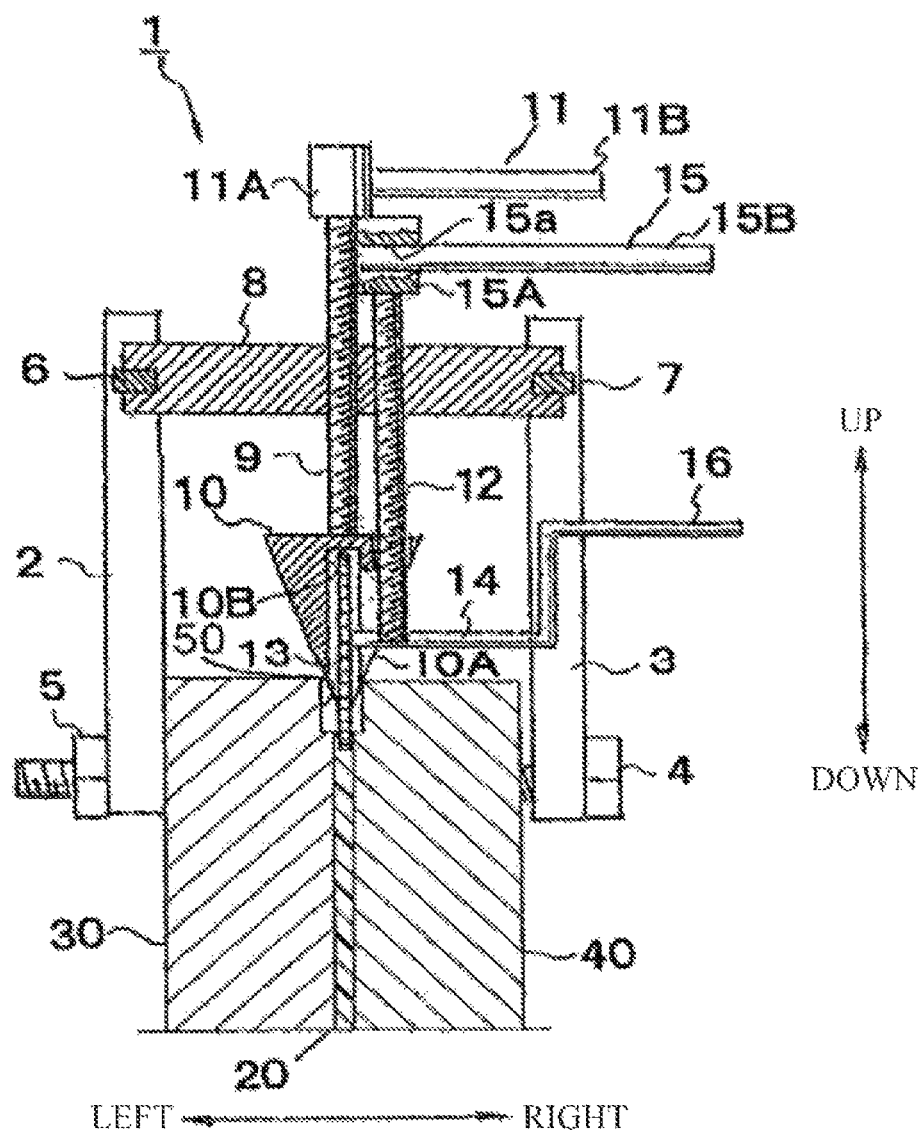
FIG. 6 is a cross-sectional view taken along a line C-C in FIG. 5.

FIG. 4 is a partial front cross-sectional view of a method of separating the liquid gasket adhesive unit according to one example embodiment of the disclosure. FIG. 5 is a cross-sectional view taken along a line B-B in FIG. 4. FIG. 6 is a cross-sectional view taken along a line C-C in FIG. 5.

A description is given by exemplifying, as the two members fastened to each other, a cylinder block and a cylinder head of an internal combustion engine. The disclosure is also applicable similarly to separation of components other than the cylinder block and the cylinder head, or to separation of two components fastened to each other of any other apparatus other than the internal combustion engine.

As illustrated in FIG. 4, flanges 30 and 40 may be integrally formed in a fastening part between the cylinder block and the cylinder head fastened to each other by unillustrated multiple bolts. The liquid gasket adhesive unit 20 may be interposed between mating faces of the flanges 30 and 40. The liquid gasket adhesive unit 20 ensures a higher sealing property for a joint surface between the flange 30 of the cylinder head and the flange 40 of the cylinder block.

For example, when the cylinder block and the cylinder head are to be separated from each other for replacement of components, for example, as illustrated in FIG. 4, the separation tool 1 according to the example embodiment of the disclosure may be mounted on the flanges 30 and 40. In one example, the pair of front and rear support brackets 2 on the left side and the pair of front and rear support brackets 3 on the right side may be fitted onto outer edges of the flanges 30 and 40 to sandwich the flanges 30 and 40 from both of the left and right sides. A width B1 between the left and right support brackets 2 and 3 of the separation tool 1 may be set to be slightly larger than a width B2 of the flanges 30 and 40 (B1>B2). A fine gap δ (=B1−B2) may be formed between the support brackets 2 and 3 and the flanges 30 and 40.

In the above-described state, unillustrated two adjacent bolt holes formed on the flanges 30 and 40 may be utilized to mount the separation tool 1 on the flanges 30 and 40. In one example, as illustrated in FIG. 4, two bolts 4 may be caused to pass through the circular holes 3a, unillustrated bolt holes formed in the flanges 30 and 40, and the circular holes 2a, although only one bolt 4 is illustrated in FIG. 4. The circular holes 3a may be formed in respective lower ends of the pair of front and rear support brackets 3. The circular holes 2a may be formed in respective lower ends of the pair of front and rear support brackets 2. A nut 5 screwed onto each of the bolts 4 may be tightened to mount the separation tool on the outer edges of the flanges 30 and 40, as illustrated in FIGS. 4 to 6. Note that a center-to-center distance L of the circular holes 2a and 3a of the left and right support brackets 2 and 3 of the separation tool 1 may be set to be equal to a pitch between the unillustrated two adjacent bolt holes formed in each of the flanges 30 and 40 (L=P).

In a state before the flanges 30 and 40 are fastened to each other, liquid packing may not be applied to outer edges of the mating faces of the flanges 30 and 40, and the liquid packing may be applied only to a part excluding the outer edges. Thus, as illustrated in FIGS. 4 to 6, a recess-shaped relief groove 50 may be formed along a longitudinal direction (i.e., a right-left direction in FIG. 5) between the outer edges of the flanges 30 and 40.

As illustrated in FIGS. 4 to 6, in a state where the separation tool 1 is mounted on the flanges 30 and 40, a tip of the wedge member 10 and a blade of the sawing cutter 13 may abut against an end surface of the liquid gasket adhesive unit 20 between the flanges 30 and 40. When the handle 11 is turned from this state to rotate the screw shank member 9 about the axial center of the screw shank member 9, the screw shank member 9 may move downward to depress the wedge member 10. This may cause both side surfaces of the wedge member 10 to engage with tip edges of an opening of the relief groove 50 formed at the outer edges of the flanges 30 and 40 and to press the outer edges of the flanges 30 and 40 apart to expand the opening of the relief groove 50. Note that, in this case, a maximum value of an amount of pressing the outer edges of the flanges 30 and 40 apart may be limited to the above-described gap δ (refer to FIG. 4).

Next, while maintaining the state where the outer edges of the flanges 30 and 40 are pressed apart by the wedge member 10 as described above, the handle 15 may be manually turned to rotate the screw shank member 12 about the axial center of the screw shank member 12. In the meantime, the handle 16 may be manually turned to rotate the sawing cutter 13. This may move the screw shank member 12 downward independently of the other screw shank member 9 to press the rotary shaft 14 of the sawing cutter 13 downward. Thus, the sawing cutter 13 may rotate while biting into the liquid gasket adhesive unit 20 to cut the liquid gasket adhesive unit 20. Note that, when the handle bar 15B of the handle 15 is unable to be turned due to interference with the screw shank member 9 upon turning the handle 15, pulling out the handle bar 15B out of the fixed member 15A and inserting the handle bar 15B into the circular hole 15a (refer to FIG. 4) of the fixed member 15A from the opposite direction make it possible to continuously operate the handle bar 15B to turn the handle 15.

When the above-described operation is finished, the handles 11 and 15 may each be reversely rotated to detach the wedge member 10 and the sawing cutter 13 from the liquid gasket adhesive unit 20. The slider 8 may be moved from this state together with the wedge member 10 and the sawing cutter 13 in the front-rear direction (i.e., the right-left direction in FIG. 5) along the guide rails 6 and 7. Thereafter, the above-described series of operations may be performed to cut a subsequent location in the liquid gasket adhesive unit 20 using the sawing cutter 13.

When the above-described operation is performed in a slidable range (i.e., a stroke S illustrated in FIG. 5) of the slider, i.e., when the cutting of the liquid gasket adhesive unit 20 is finished within a range of the pitch between the two adjacent bolt holes formed in each of the flanges 30 and 40, the separation tool 1 may be removed from the flanges 30 and 40. Thereafter, unillustrated two subsequent adjacent bolt holes may be utilized to mount the separation tool 1 on other positions of the flanges 30 and 40, and the above-described operation may be repeated. When the cutting of the liquid gasket adhesive unit 20 interposed between the mating faces of flanges 30 and 40 is performed by such an operation throughout the entire periphery of the outer edge thereof, adhesive force of the liquid gasket adhesive unit 20 may be weakened, thus making it possible to easily separate the cylinder block and the cylinder head from each other with small force.

As is obvious from the above description, in the method of separating the liquid gasket adhesive unit 20 according to an example embodiment of the disclosure using the separation tool 1 according to the example embodiment of the disclosure, it is possible to cut the liquid gasket adhesive unit 20 interposed between the mating faces of the cylinder block and the cylinder head in such a state that the flanges 30 and 40 are pressed apart by the wedge member 10, with better operability in a short period of time by rotating the sawing cutter 13. Thus, it is possible to easily and surely separate the cylinder block and the cylinder head from each other. Upon the separation of the cylinder block and the cylinder head from each other, no new additional processing is necessary for the separation of the cylinder block and the cylinder head from each other. Thus, it is possible to keep processing costs low for the separation of the cylinder block and the cylinder head from each other.

Although the description has been given above by exemplifying the cylinder block and the cylinder head of the internal combustion engine as the two members fastened to each other, the disclosure is also applicable similarly to separation of components other than the cylinder block and the cylinder head, e.g., any components such as the cylinder head and a cylinder head cover or a chain case of the cylinder block. Alternatively, the disclosure is also applicable similarly to separation of two components fastened to each other of any other apparatus other than the internal combustion engine.

The disclosure is by no means limited to the embodiments described above in terms of the application. It should be appreciated that various modifications may be made within the technical idea described in the appended claims, specification, and drawings.

According to an example embodiment of the disclosure, an effect is obtained that makes it possible to separate two members from each other easily and surely by cutting the liquid gasket adhesive unit interposed between mating faces of the two members in a short period of time with better operability, without processing for separation.

The invention claimed is:

1. A separation tool for a liquid gasket adhesive unit, the separation tool being configured to separate two members from each other by detaching the two members including respective end surfaces adhered to each other with the liquid gasket adhesive unit interposed therebetween,
the separation tool comprising:
a wedge member configured to be pressed by a pressing part into a gap between the end surfaces of the two members between which the liquid gasket adhesive unit is interposed; and
a rotary sawing cutter held inside the wedge member and configured to be moved separately from the wedge member in a direction toward the liquid gasket adhesive unit in the gap between the end surfaces of the two members pressed apart by the wedge member.

2. The separation tool for the liquid gasket adhesive unit according to claim 1, wherein
the pressing part comprises
support brackets in a pair mounted on respective outsides of the two members adhered to each other,
guide rails each stretched between the support brackets,
a slider spanning between the guide rails and being configured to be slidably moved along the guide rails, and
a first screw shank member screwed and inserted into the slider and being configured to move forward and backward with respect to the end surfaces of the two members by a rotary action, wherein
the wedge member is pressed into the gap by a proceeding action of the first screw shank member to perform the pressing action.

3. The separation tool for the liquid gasket adhesive unit according to claim 2, further comprising:
a second screw shank member screwed and inserted into the slider and configured to move forward and backward with respect to the end surfaces of the two members by a rotary action; and
a through-hole provided in the wedge member and configured to allow the second screw shank member to penetrate therethrough in an unscrewed state, wherein
the rotary sawing cutter is configured to be moved in the direction toward the liquid gasket adhesive unit by pressing a rotary shaft part of the rotary sawing cutter by a proceeding action of the second screw shank member.

4. A method of separating a liquid gasket adhesive unit from two members including respective end surfaces adhered to each other with the liquid gasket adhesive unit interposed therebetween using the separation tool according to claim 3, the method comprising:
mounting the support brackets of the separation tool on respective outsides of the two members;
pressing the wedge member into the gap between the end surfaces of the two members, between which the liquid gasket adhesive unit is interposed, by the proceeding action of the first screw shank member of the pressing part to press the two members apart; and
cutting the liquid gasket adhesive unit by depressing and rotating the rotary sawing cutter by the proceeding action of the second screw shank member while maintaining a state of the two members being pressed apart by the pressing of the wedge member.

5. The method of separating the liquid gasket adhesive unit according to claim 4, wherein the cutting of the liquid gasket adhesive unit comprises changing a cutting position of the liquid gasket adhesive unit by slidably moving the wedge member, the rotary sawing cutter, and the slider along guide rails for integral movement.

* * * * *